United States Patent
Guo et al.

(10) Patent No.: US 10,965,875 B2
(45) Date of Patent: Mar. 30, 2021

(54) QUERY RESPONSE BY A GIMBAL MOUNTED CAMERA

(71) Applicant: SZ DJI OSMO TECHNOLOGY CO., LTD., Shenzhen (CN)

(72) Inventors: Zhuo Guo, Shenzhen (CN); Paul Pan, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/519,564

(22) Filed: Jul. 23, 2019

(65) Prior Publication Data

US 2019/0349533 A1 Nov. 14, 2019

Related U.S. Application Data

(63) Continuation of application No. PCT/CN2017/072450, filed on Jan. 24, 2017.

(51) Int. Cl.
| | |
|---|---|
| *H04N 5/225* | (2006.01) |
| *H04N 5/232* | (2006.01) |
| *G06F 16/2457* | (2019.01) |
| *F16M 11/04* | (2006.01) |
| *F16M 11/10* | (2006.01) |
| *F16M 11/18* | (2006.01) |

(Continued)

(52) U.S. Cl.
CPC ....... *H04N 5/23299* (2018.08); *F16M 11/041* (2013.01); *F16M 11/10* (2013.01); *F16M 11/18* (2013.01); *F16M 11/205* (2013.01); *F16M 11/22* (2013.01); *F16M 13/04* (2013.01); *G03B 17/561* (2013.01); *G06F 3/16* (2013.01); *G06F 16/24575* (2019.01); *G06T 7/20* (2013.01); *H04N 5/2253* (2013.01)

(58) Field of Classification Search
CPC .. H04N 5/225; H04N 5/2253; H04N 5/23299; G06F 16/24575; G06F 3/16; F16M 11/041; F16M 11/10; F16M 11/18; F16M 11/205; F16M 11/22; F16M 13/04; G03B 17/561; G06T 7/20
USPC ...................................... 348/169–172, 208.2
See application file for complete search history.

(56) References Cited

U.S. PATENT DOCUMENTS

| | | | | |
|---|---|---|---|---|
| 7,932,925 | B2 * | 4/2011 | Inbar | H04N 5/23274 348/208.2 |
| 10,455,158 | B2 * | 10/2019 | Ristroph | H04N 5/2328 |

(Continued)

FOREIGN PATENT DOCUMENTS

| | | |
|---|---|---|
| CN | 101282423 A | 10/2008 |
| CN | 102045548 A | 5/2011 |

(Continued)

OTHER PUBLICATIONS

World Intellectual Property Organization (WIPO) International Search Report and Written Opinion for PCT/CN2017/072450 dated Oct. 20, 2017 6 pages.

*Primary Examiner* — Trang U Tran

(74) *Attorney, Agent, or Firm* — Anova Law Group, PLLC

(57) ABSTRACT

A method includes, at an electronic gimbal device having one or more processors and memory storing instructions for execution by the one or more processors, receiving a user-provided query, determining a gimbal response to the user-provided query in response to receiving the user-provided query, and controlling the electronic gimbal device to indicate the determined gimbal response.

17 Claims, 9 Drawing Sheets

(51) Int. Cl.
*F16M 11/20* (2006.01)
*F16M 11/22* (2006.01)
*F16M 13/04* (2006.01)
*G03B 17/56* (2021.01)
*G06F 3/16* (2006.01)
*G06T 7/20* (2017.01)

(56) References Cited

U.S. PATENT DOCUMENTS

| | | | | |
|---|---|---|---|---|
| 2011/0304737 A1* | 12/2011 | Evans | ............ | G01S 3/7864 |
| | | | | 348/169 |
| 2012/0140071 A1 | 6/2012 | Judell | | |
| 2019/0178436 A1* | 6/2019 | Mao | ............ | H04N 5/2253 |

FOREIGN PATENT DOCUMENTS

| | | |
|---|---|---|
| CN | 102111541 A | 6/2011 |
| CN | 103248633 A | 8/2013 |
| CN | 204993612 U | 1/2016 |
| CN | 105438492 A | 3/2016 |
| CN | 105657233 A | 6/2016 |
| CN | 205408035 U | 7/2016 |
| CN | 105959545 A | 9/2016 |
| CN | 106292741 A | 1/2017 |
| CN | 205883381 U | 1/2017 |
| JP | 2008232944 A | 10/2008 |
| WO | 2010053809 A1 | 5/2010 |

* cited by examiner

Gimbal Operating Environment 100

800

(A)

814
Control the electronic gimbal device to indicate the determined gimbal response

816
Controlling the electronic gimbal device comprises rotating a gimbal-mounted camera of the electronic gimbal device about at least one of a pan axis, a tilt axis, or a roll axis

818-a
Capturing, by a gimbal-mounted camera or by a camera of a user mobile device, two or more images
818-b
detecting a movement pattern of a target within the two or more images and
818-c
determining the gimbal response using information that includes the detected movement pattern

820
Controlling the electronic gimbal device includes directing the gimbal-mounted camera toward the target.

QUERY RESPONSE BY A GIMBAL MOUNTED CAMERA

CROSS-REFERENCE TO RELATED APPLICATION

This application is a continuation of International Application No. PCT/CN2017/072450, filed Jan. 24, 2017, the entire content of which is incorporated herein by reference.

TECHNICAL FIELD

The disclosed embodiments relate generally to a gimbal, and more particularly, but not exclusively, to controlling the electronic gimbal device.

BACKGROUND

A gimbal mount is used to reduce or eliminate uncontrolled movement of an object in response to movement of the structure on which the object is supported. Some gimbals allow movement of an object to be controlled in one or more axes. A gimbal used to support a camera improves image capture stability and allows smooth movement of the camera when the camera is hand carried or supported on a moving object, such as a vehicle or recreational device. By isolating a camera from movement of its support structure, a gimbal reduces unwanted camera vibration when the camera captures images and video.

SUMMARY

There is a need for systems and methods for controlling an electronic gimbal device in response to queries from users. Such systems and methods optionally complement or replace conventional methods for controlling the operation of a gimbal.

In accordance with some embodiments, a method comprises receiving a user-provided query at an electronic gimbal device that has one or more processors and memory storing instructions for execution by the one or more processors. In response to receiving the user-provided query, a gimbal response to the user-provided query is determined. The electronic gimbal device is controlled to indicate the determined gimbal response.

In accordance with some embodiments, a system comprises an electronic gimbal device that includes one or more processors communicatively coupled to one or more actuators for adjusting a position of the electronic gimbal device. The one or more processors are configured for receiving a user-provided query. The one or more processors are also configured for, in response to receiving the user-provided query, determining a gimbal response to the user-provided query. The one or more processors are further configured for controlling the electronic gimbal device to indicate the determined gimbal response.

In accordance with some embodiments, a non-transitory computer readable storage medium stores one or more programs. The one or more programs comprise instructions, which when executed, cause an electronic gimbal device to receive a user-provided query. The one or more programs also comprise instructions that cause the electronic gimbal device to, in response to receiving the user-provided query, determine a gimbal response using information from the user-provided query. The one or more programs also comprise instructions that cause the electronic gimbal device to indicate the determined gimbal response.

BRIEF DESCRIPTION OF THE DRAWINGS

FIGS. 8A-8B are flow diagrams illustrating a method for adjusting a position of a gimbal-mounted camera to indicate a gimbal response to a user-provided query, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

A gimbal that supports a camera improves image stability by providing vibration isolation. The gimbal includes actuators that can be used to control a position (e.g., attitude) of the camera with respect to the gimbal. The actuators that control the position of the camera are also usable to provide information to a user. For example, when a user provides input, such as a question, to the gimbal, the gimbal provides an "answer" to the question by moving a gimbal-mounted camera in a way that indicates a response to the question. In this way, the user is provided with an intuitive and anthropomorphic interaction with the gimbal. A gimbal that provides information to a user by adjustment of camera position (e.g., attitude) is enabled to provide information to a user without requiring an alternative output device such as a display or audio output device. Further, the information provided by a gimbal via adjustment of gimbal-mounted camera position is understandable by many users without requiring language localization. When a gimbal is coupled to a user device, such as a user mobile phone, the information provided to a user by adjustment of gimbal-mounted camera position is usable to provide information in addition to any information displayed on the user device.

In some embodiments, a user can use techniques described herein to control movement of a gimbal-mounted camera without manually providing input to reposition the gimbal-mounted camera. A user may desire to use the gimbal to control the gimbal-mounted camera position for a smoother motion of the camera than the user could achieve by manually moving the camera. In some embodiments, a user uses a gimbal to control the gimbal-mounted camera in order remotely operate the camera (e.g., via voice activation). For example, when a camera is mounted to a gimbal that is attached to a vehicle or a recreational object, the user may have a limited ability or opportunity to provide control input to control movement of the camera and configuration of camera control parameters (e.g., while the user is operating the vehicle or object).

Figure 1:
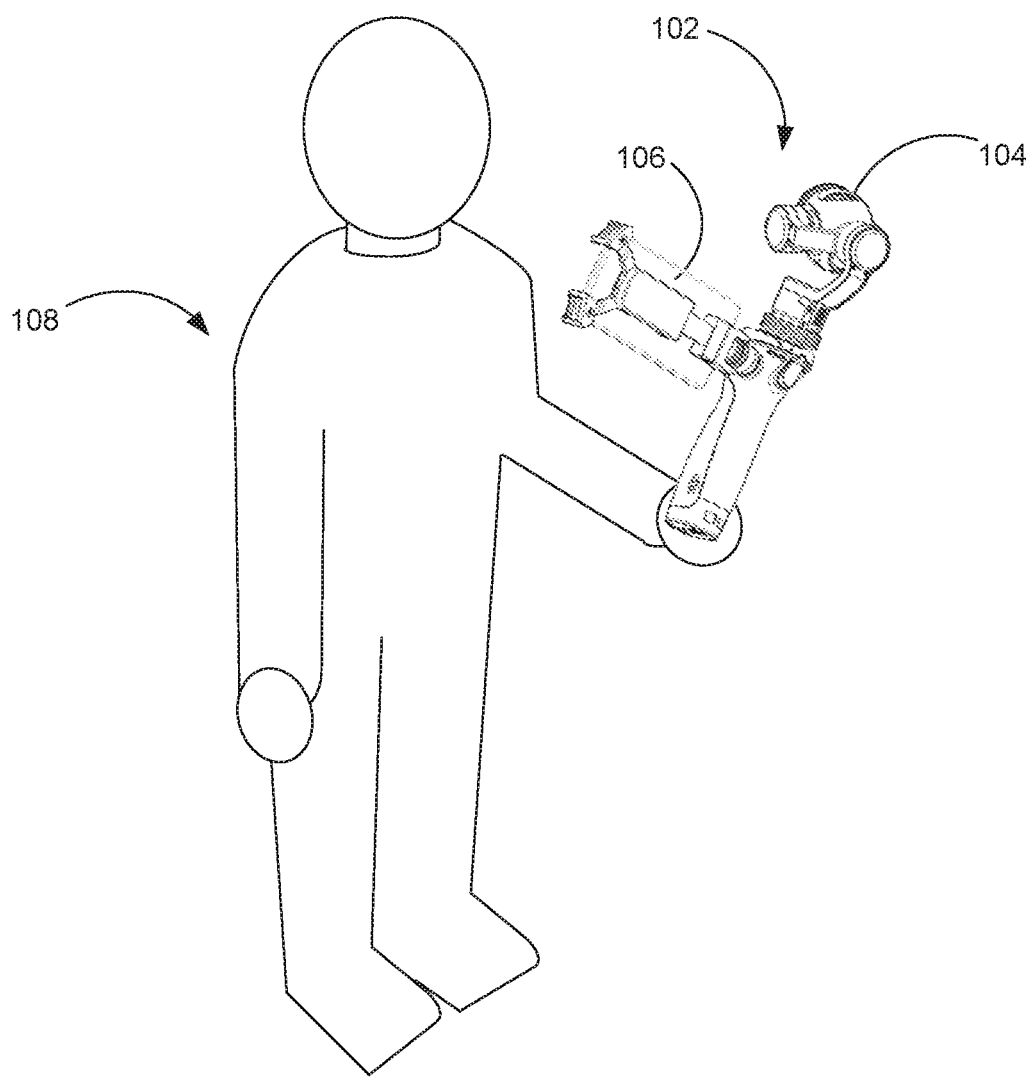
FIG. 1 illustrates a gimbal operation environment, in accordance with some embodiments.

FIG. 1 illustrates a gimbal operation environment 100, in accordance with an illustrative embodiment. A gimbal 102, as shown in the gimbal operation environment 100, includes a camera 104. An electronic device 106 is mounted to the gimbal 102. The gimbal 102, the camera 104, and the electronic device 106 (e.g., a mobile telephone or other electronic device) are described in further detail below with regard to FIGS. 2-4. In FIG. 1, an operator 108 is shown supporting the gimbal 102 for handheld operation of the camera 104. It will be recognized that, in other embodiments, the gimbal 102 may be supported by a vehicle or other device.

Figure 2:
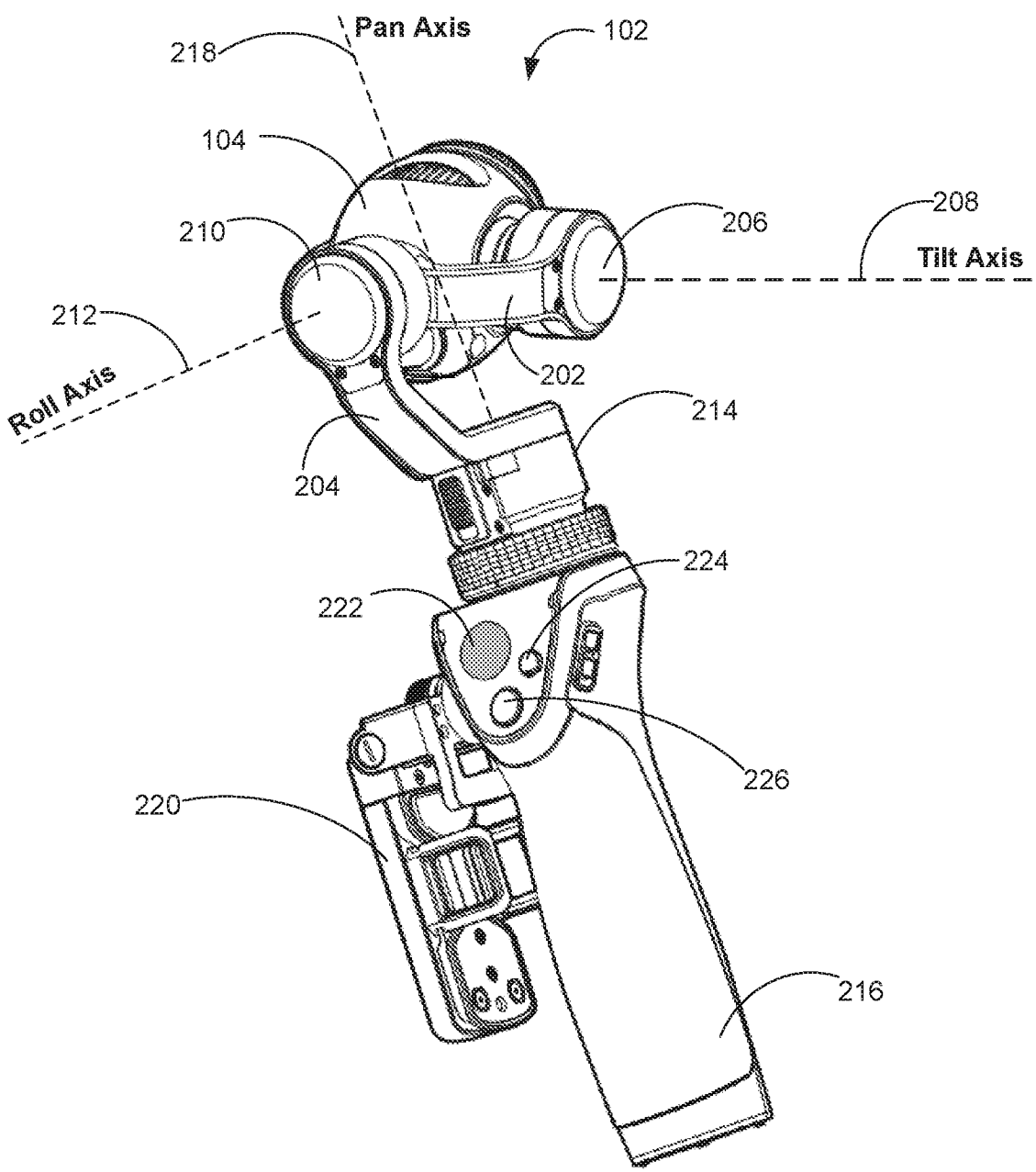
FIG. 2 illustrates a rear view of a gimbal, in accordance with some embodiments.

FIG. 2 illustrates a rear view of the gimbal 102, in accordance with some embodiments. The camera 104 is pivotably mounted to the gimbal 102 via a tilt motor bracket 202 and a roll motor bracket 204. A tilt motor 206 is coupled to tilt motor bracket 202. The tilt motor 206 controls motion of the camera 104 about the tilt axis 208. A roll motor 210 is coupled to the roll motor bracket 204. The roll motor 210 controls motion of the camera 104 about the roll axis 212. A pan motor 214 is coupled to the roll motor bracket 204 and the gimbal body 216. The pan motor 214 controls motion of the camera 104 about the pan axis 218.

A support bracket 220 into which the electronic device 106 can be inserted is adjustably coupled to the gimbal body 216. In FIG. 2, the support bracket 220 is shown in an undeployed position and no electronic device 106 is inserted in support bracket 220. In some embodiments, electronic device 106 is detachably mounted to support bracket 220 (e.g., the electronic device is inserted into support bracket 220 and subsequently removed from support bracket 220).

In some embodiments, the gimbal 102 includes an input device 222 (e.g., a joystick) for receiving user input to control motion of the camera about the pan axis 218, the tilt axis 208, and/or the roll axis 212.

In some embodiments, the gimbal 102 includes a record control 224 for starting and/or stopping capture of a sequence of images (e.g., video) by the camera 104.

In some embodiments, the gimbal 102 includes a shutter control 226 for capturing a single image by the camera 104.

Figure 3:
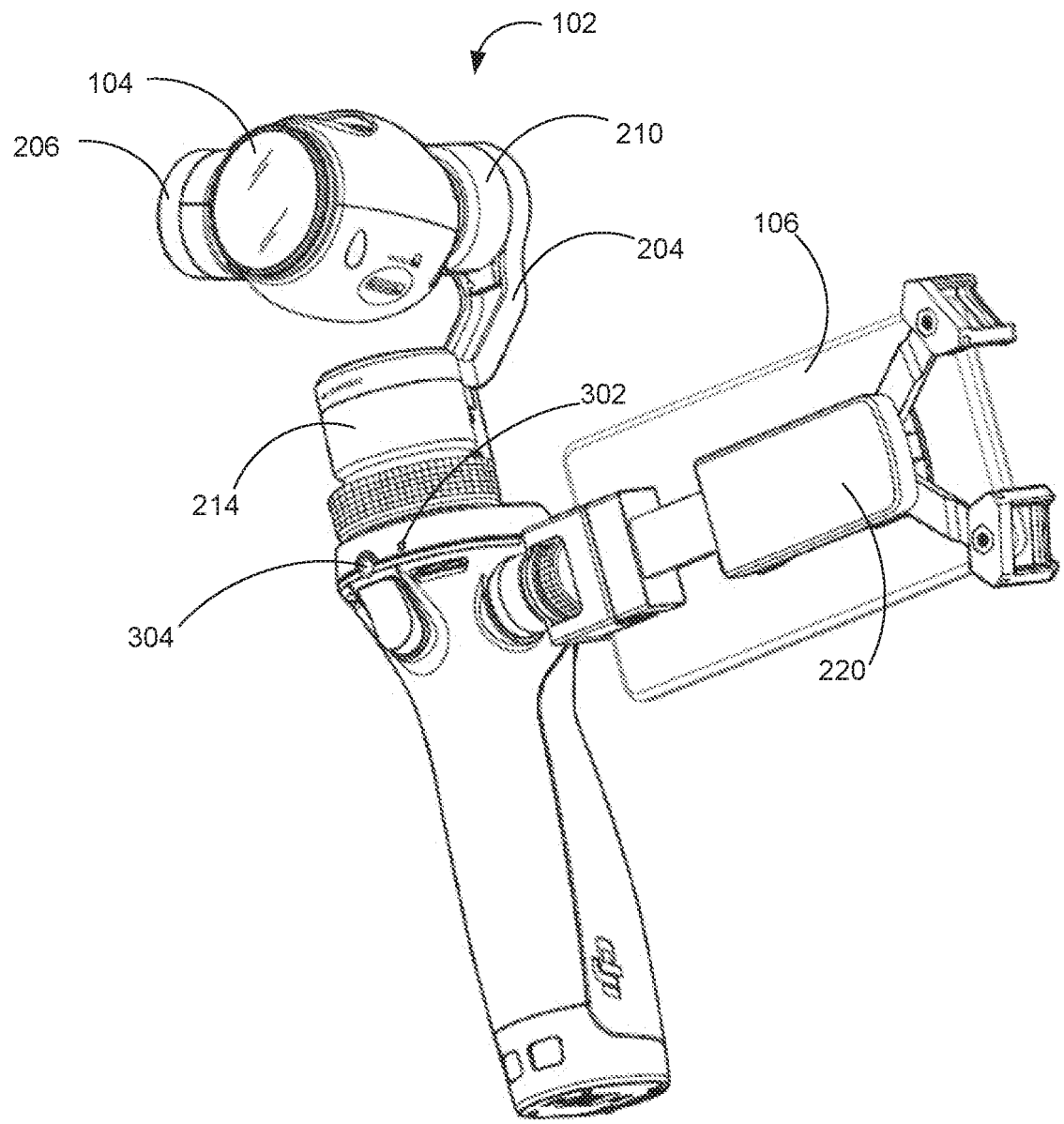
FIG. 3 illustrates a front view of a gimbal, in accordance with some embodiments.

FIG. 3 illustrates a front view of the gimbal 102, in accordance with some embodiments. In FIG. 3, the electronic device 106 is shown inserted into the support bracket 220 and the support bracket 220 is shown in a deployed position. In some embodiments, the gimbal 102 includes one or more audio input devices, such as a microphone 302 (e.g., a built-in microphone) and/or a microphone input 304 (e.g., a connector for receiving input from an external microphone).

Figure 4:
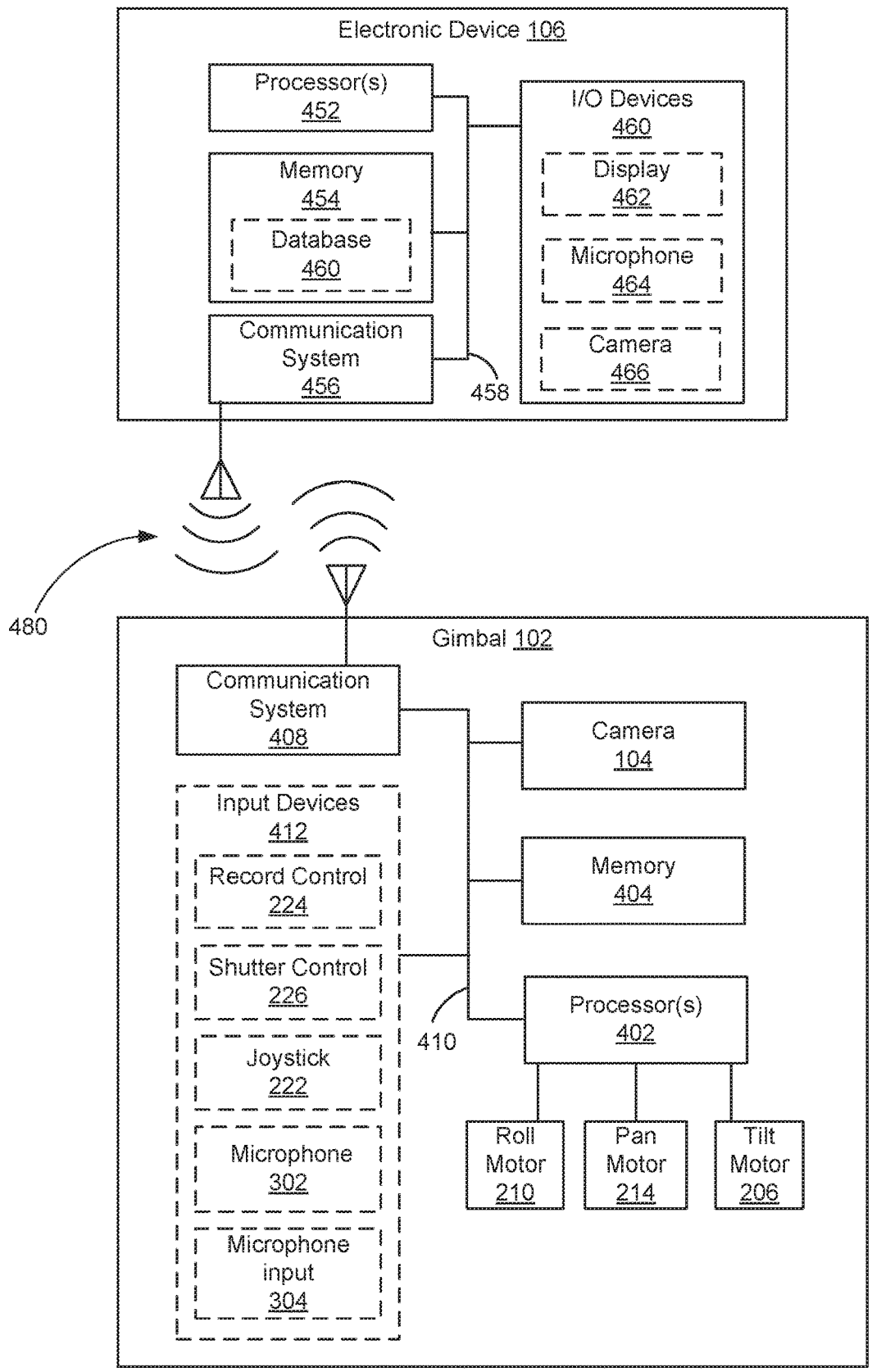
FIG. 4 shows block diagrams of a gimbal and an electronic device, in accordance with some embodiments.

FIG. 4 shows block diagrams of the gimbal 102 and the electronic device 106, in accordance with some embodiments.

The gimbal 102 typically includes one or more processing units 402, a memory 404, a camera 104, a communication system 408, and a communication bus 410 for interconnecting these components.

In some embodiments, the gimbal memory 404 stores one or more programs (e.g., sets of instructions), modules, and/or data structures, collectively referred to as "elements" herein. In some embodiments, the gimbal memory 404 stores an element for receiving user instructions and/or information associated with user instructions (e.g., a set of one or more gimbal operating parameters and camera operating parameters based on the first user instructions) from the electronic device 106.

In some embodiments, the gimbal memory 404 stores an element for controlling movement of one or more actuators such as the roll motor 210, the pan motor 214, and/or the tilt motor 206 (e.g., by causing the processor(s) 402 to transmit a signal to the roll motor 210, the pan motor 214, and/or the tilt motor 206).

In some embodiments, the gimbal memory 404 stores an element for controlling camera functions, setting camera parameters, and/or adjusting camera parameters (e.g., capture still image, start video capture, stop video capture, zoom in, zoom out, adjust focus, set shutter speed, set aperture, set ISO, set frame rate, set frame resolution and/or set parameters of a target for the camera to follow). In some embodiments, camera 104 includes a memory and/or processor for controlling camera functions, setting camera parameters, and or adjusting camera parameters in response to information received from gimbal 102 and/or from electronic device 106.

The camera 104 captures still images, sequences of images, and/or video. In some embodiments, camera 104 is a digital camera that includes an image sensor and an optical device. The image sensor is, e.g., a sensor that detects light, such as visible light, infrared light, and/or ultraviolet light. In some embodiments, the image sensor includes, e.g., semiconductor charge-coupled devices (CCD), active pixel sensors using complementary metal-oxide-semiconductor (CMOS) and/or N-type metal-oxide-semiconductors (NMOS, Live MOS). In some embodiments, in response to camera configuration operations, the optical device is moved relative to the image sensor by an imaging device actuator. The optical device affects the focus of light that arrives at the image sensor. For example, the optical device is a lens or a device including multiple lenses (e.g., a compound lens).

In some embodiments, the gimbal 102 includes one or more input devices 412. The input devices 412 include, e.g., a record control 224 (for starting and stopping recording by camera 104), a shutter control 226 (for capturing a single image by camera 104), a joystick 222 (for controlling movement of camera 104), a microphone 302 (for capturing environmental sound), and/or a microphone input 304 (for receiving a connector that is attached to a microphone). In some embodiments, one or more input devices 412 of the gimbal 102 (e.g., joystick 222) receive user input to control aspects of the gimbal 102 and/or the camera 104 such as movement (pan, tilt, roll, and/or zoom), velocity of movement, acceleration of movement, image recognition, and/or tracking.

The communication system 408 enables communication with the electronic device 106, e.g., via wireless signals 480. The communication system 408 includes, e.g., transmitters, receivers, and/or transceivers for wireless communication. In some embodiments, the communication is one-way communication, such that data is transmitted by the gimbal 102 to the electronic device 106 or transmitted by the electronic device 106 to the gimbal 102. In some embodiments, communication is two-way communication, such that data is transmitted by the gimbal 102 to the electronic device 106 and transmitted by the electronic device 106 to the gimbal 102.

The gimbal 102 uses communication system 408 to communicate with the electronic device 106, e.g., to receive user instructions from the electronic device 106, and/or to transmit data (e.g., images and/or video captured by camera 104) to the electronic device 106.

The electronic device 106 typically includes one or more processing units 452, a memory 454, a communication system 456, and a communication bus 458 for interconnecting these components.

The electronic device 106 is, e.g., a portable electronic device (e.g., a mobile phone), a tablet, and/or a laptop computer. For example, the electronic device 106 is a portable electronic device that can be inserted in a support bracket 220 of gimbal 102. In some embodiments, it is desirable for the electronic device 106 to be sufficiently small and lightweight that a user can operate gimbal 102 as a handheld device while the electronic device 106 is mounted on support bracket 220. In some embodiments, electronic device 106 is a device that is remote from gimbal 102, such as a server computer, desktop computer, or other computing device.

The electronic device communication system 456 enables communication with the gimbal 102, e.g., via wireless signals 480. The communication system 456 includes, e.g., transmitters, receivers, and/or transceivers for wireless communication.

The electronic device 106 uses communication system 456 to communicate with the gimbal 102, e.g., to transmit data (e.g., control instructions) to the gimbal 102, and/or to receive data (e.g., images captured by camera 104) from the gimbal 102.

In some embodiments, the electronic device 106 communicates (e.g., wirelessly) with a remote computing device that is remote from gimbal 102 and electronic device 106, such as a server or desktop computer. For example, in some embodiments, the electronic device 106 communicates (e.g., via a network such as the Internet) with a remote device that provides data storage, data retrieval, and/or data processing operations, e.g., to reduce the processing power and/or data storage requirements of the gimbal 102 and/or the electronic device 106. For example, the remote computing device is communicatively connected to a database and/or the remote computing device includes a database (e.g., a database that is consulted for determining a set of one or more gimbal operating parameters and camera operating parameters based on a user instruction).

In some embodiments, the electronic device 106 includes one or more devices for receiving input from a user and/or providing output to a user (the I/O devices 460). For example, I/O devices 460 include, e.g., a display 462, a microphone 464, and/or a camera 466. In some embodiments, a display 462 displays one or more input indicators such as a virtual keyboard, button, and/or slider. In some embodiments, display 462 is a touchscreen that receives input by a contact at a location that corresponds to a displayed input indicator. For example, electronic device 106 receives input for movement of gimbal 102 and/or camera 104 via controls displayed on a touchscreen display. In some embodiments, I/O devices 460 include a keypad, button, knob, dial, or other input device for receiving user instructions. In some embodiments, I/O devices 460 include a loudspeaker for providing information (e.g., candidate user instructions).

In some embodiments, the display 462 displays information generated by the camera 104 and/or by the gimbal 102. For example, the display displays information about the camera 104, such as information that indicates the orientation of the camera 104. In some embodiments, information displayed by a display of the electronic device 106 includes images captured by the camera 104, video captured by the camera 104, tracking data (e.g., a graphical tracking indicator applied to a representation of a target), and/or indications of user instructions transmitted to the gimbal 102. In some embodiments, information displayed by the display of the display 462 is displayed in substantially real-time as information is received from the gimbal 102 and/or as image data is acquired.

In some embodiments, a user can designate a target for tracking by providing input (e.g., selecting the target on a display 462, providing a spoken command identifying the target to a microphone (e.g., the microphone 464), and/or providing other information to define the target via control provided at an input device of the electronic device 106.

In some embodiments, the electronic device memory 454 stores one or more programs (e.g., sets of instructions), modules, and/or data structures, collectively referred to as "elements" herein. One or more elements described with regard to the gimbal memory 404 are optionally stored by the electronic device 106, a remote computing device, and/or another device.

In some embodiments, the electronic device memory 454 includes a database 460. The database 460 stores, e.g., sets of one or more predefined parameters (e.g., a set of one or more gimbal operating parameters and camera operating parameters) that correspond to user instructions.

In some embodiments, the electronic device memory 454 includes a user instruction processing element. The user instruction processing element stores instructions for determining a set of one or more gimbal operating parameters and camera operating parameters based on a user instruction (e.g., using the database 460 or a database of a remote device that is communicatively coupled to the electronic device 106). In some embodiments, the user instruction processing element includes a voice processing element for determining information that corresponds to a user-provided query (e.g., a user provided-query received via the microphone 464, the microphone 302, or a microphone connected to microphone input 304). In some embodiments, information that corresponds to a user provided-query received via the microphone 302 or a microphone connected to the microphone input 304 is transmitted from the gimbal 102 to the electronic device 106 (e.g., via communication system 456 and/or communication system 408).

In some embodiments, the electronic device memory 454 stores information about one or more targets, such as: identifying information that corresponds to a target; a GPS location of the target; target type information such as color, texture, pattern, size, shape, and/or dimension of a target; an image of a target; an initial position (e.g., location coordinates, such as pixel coordinates within an image) of a target; and/or a size of a target within one or more images. In some embodiments, the target type information is provided by a user to the electronic device 106 via an input device 460. In some embodiments, the user selects a pre-existing target pattern or type (e.g., a black object or a round object with a radius greater or less than a certain value). In some embodiments, user input to provide target type information includes user selection of one or more targets from within one or more images (e.g., images captured by the camera 104 and displayed by display 462). In some embodiments, features or characteristics of the selected targets are extracted and/or generalized to produce the target type information, which is used, e.g., to identify targets with features or characteristics indicated by the target type information In some embodiments, the targeting information is used to track a target. For example, the targeting information is used by a tracking element (e.g., stored by the memory 454 of the electronic device 106 and/or by the memory 404 of the gimbal 102) for adjusting gimbal 102 and/or camera 104 in response to information about the position and/or size of a target within an image captured by the camera 104. In some embodiments, targeting information is used by an image analysis module to identify a target.

The above identified modules or programs (i.e., sets of instructions) need not be implemented as separate software programs, procedures or modules, and thus various subsets of these modules may be combined or otherwise re-arranged in various embodiments. In some embodiments, the memory 404 and/or the memory 454 store a subset of the modules and data structures identified above. Furthermore, the memory 404 and/or the memory 454 may store additional modules and data structures not described above. In some embodiments, the programs, modules, and data structures stored in the memory 404 and/or the memory 454, or a non-transitory computer readable storage medium of the memory 404 and/or the memory 454, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 402 and/or processor(s) 452. In some embodiments, one or more of the above identified elements is executed by one or more processors of a device remote from the gimbal 102 and the electronic device 106.

Figure 5:
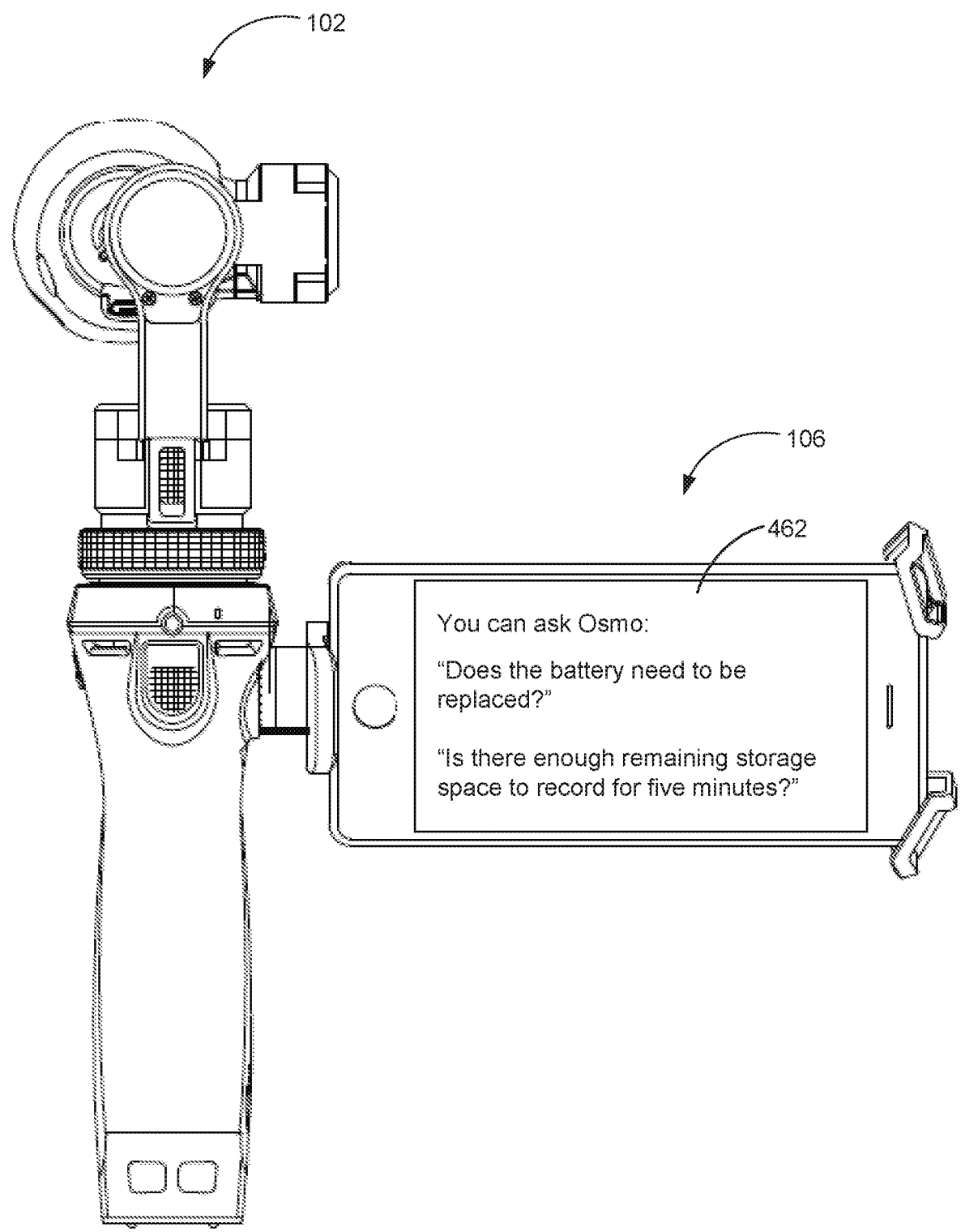
FIG. 5 illustrates a set of candidate user instructions displayed on the display of an electronic device, in accordance with some embodiments.

FIG. 5 illustrates a set of candidate user-provided queries displayed on the display 462 of the electronic device 106, in accordance with some embodiments. In some embodiments, the electronic device 106 receives a user-provided query via the microphone 464 of the electronic device 106 (and/or the electronic device 106 receives a signal that includes information received via the microphone 302 and/or the microphone input 304 of the gimbal 102). For example, a user provides the user-provided query by speaking an instruction, and the instruction is detected by a microphone (e.g., the microphone 464, the microphone 302, and/or a microphone connected to microphone input 304).

In some embodiments, to inform a user of available queries, the set of user-provided queries (e.g., the set of queries that correspond to queries the electronic device 106 is configured to recognize), or a subset of the set of user-provided queries, is displayed on the display 462. The illustrative set of candidate user-provided queries (e.g., "Does the battery need to be replaced?" and "Is there enough remaining storage space to record for five minutes?") shown in FIG. 5 provide a user with an indication of user-provided queries that will be recognized by the electronic device 106 and/or gimbal 102 (e.g., based on information stored in memory 404, memory 454, and/or database 460). In some embodiments, an identifier is associated with each displayed query. For example, a stored identifier corresponds to data associated with the user-provided queries (e.g., a voiceprint and/or information that can be derived from a voiceprint). In some embodiments, when a user speaks the user-provided query (e.g., "Does the battery need to be replaced?"), the received audio signals are processed to determine an identifier that corresponds to the spoken user instruction. An adjustment to a position (e.g., attitude) of a gimbal-mounted camera (e.g., camera 104) is determined based on the determined identifier. In some embodiments, the audio signal processing and/or adjustment determination is performed by electronic device 106. In some embodiments, the audio signal processing and/or adjustment determination is performed by gimbal 102 (e.g., the electronic device 106 transmits information to the gimbal 102 including the audio signal, information determined from the audio signal, and/or adjustment information.) In some embodiments, gimbal 102 executes instructions to adjust the gimbal-mounted camera (e.g., providing a signal to motor 214 to rotate the camera 104 about the tilt axis 208 in order to simulate "head nodding").

Figure 6A:
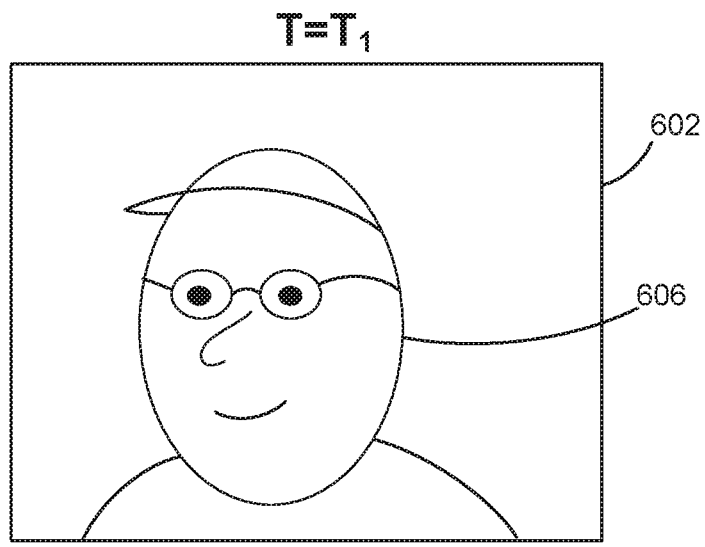
FIGS. 6A-6B are an illustrative set of images from which a movement pattern is detected, in accordance with some embodiments.
Figure 6B:
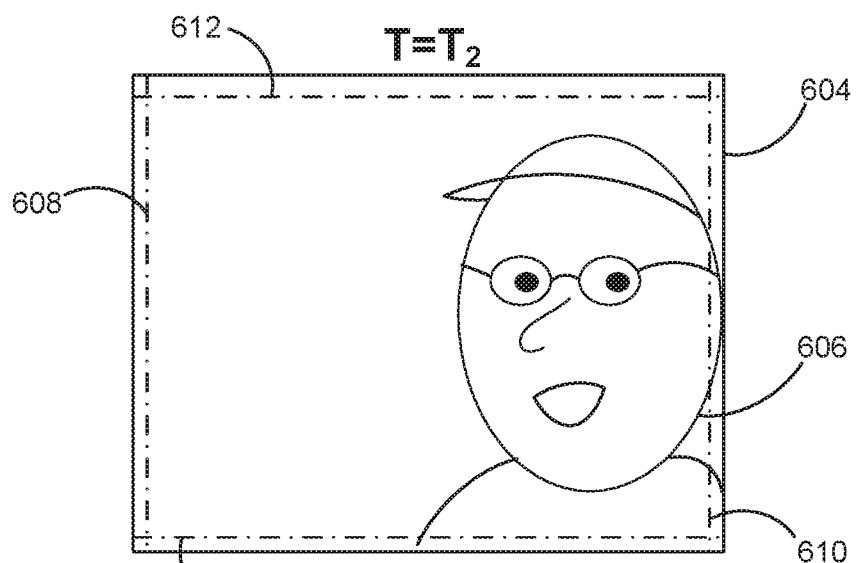

FIGS. 6A-6B are an illustrative set of images from which a movement pattern is detected, in accordance with some embodiments. FIG. 6A is a first image 602 captured at a first time $T=T_1$ and FIG. 6B is a second image 604 captured at a second time $T=T_2$ that is later than $T_1$. A subject 606 (e.g., a face) is shown in the images 602 and 604. In some embodiments, a movement pattern is detectable from analysis of the first image 602 and the second image 604. For example, the subject 606 moves from a first position in the approximate center of the first image 602 to a second position at the right edge of second image 602. Image analysis performed on first image 602 and second image 604 detect a movement pattern (e.g., movement of subject 606 to the right within the image frame). If the subject 606 continues to move along the path indicated by first image frame 602 and second image frame 604, it will be necessary adjust the gimbal 102 and/or the camera 104 to continue capturing the subject 606 in images captured after time $T_2$ (e.g., by panning the camera to the right). In some embodiments, an adjustment to a position of a gimbal-mounted camera is determined based on a detected motion pattern determined based on at least a first image frame (e.g., the first image frame 602) and a second image frame (e.g., the second image frame 604). In some embodiments, detecting a movement pattern and/or an adjustment to a position of a gimbal-mounted camera is performed by electronic device 106. In some embodiments, detecting a movement pattern and/or an adjustment to a position of a gimbal-mounted camera is performed by gimbal 102.

In some embodiments, the subject 606 is a target being tracked (e.g., a target designated via input provided to the gimbal 102 and/or the electronic device 106). In some embodiments, the gimbal 102 is operated to re-direct the camera 104 at the subject 606 when movement of the subject 606 exceeds a predefined boundary. For example, the boundary is an edge of an image frame (e.g., a boundary 608 adjacent to the left edge of the image frame 604, a boundary 610 adjacent to the right edge of the image frame 604, a boundary 612 adjacent to the upper edge of the image frame 604, and/or a boundary 614 adjacent to the lower edge of the image frame 604). In the second image frame 604, the subject 606 has moved beyond a boundary 610 such that subject 606 is between the boundary 610 and the right edge of second image frame 604. In some embodiments, in accordance with a determination that the subject 606 has moved beyond the boundary 610, gimbal 102 adjusts the gimbal-mounted camera 104 such that gimbal-mounted camera 104 is directed at subject 606 (e.g., such that no part of subject 606 is between a boundary and an edge of an image frame). In some embodiments, adjustment of a position of the gimbal-mounted camera 104 is limited such that movement of the gimbal-mounted camera 104 does not cause a target (e.g., subject 606) to enter an area between a boundary and an edge of an image frame.

Figure 7:
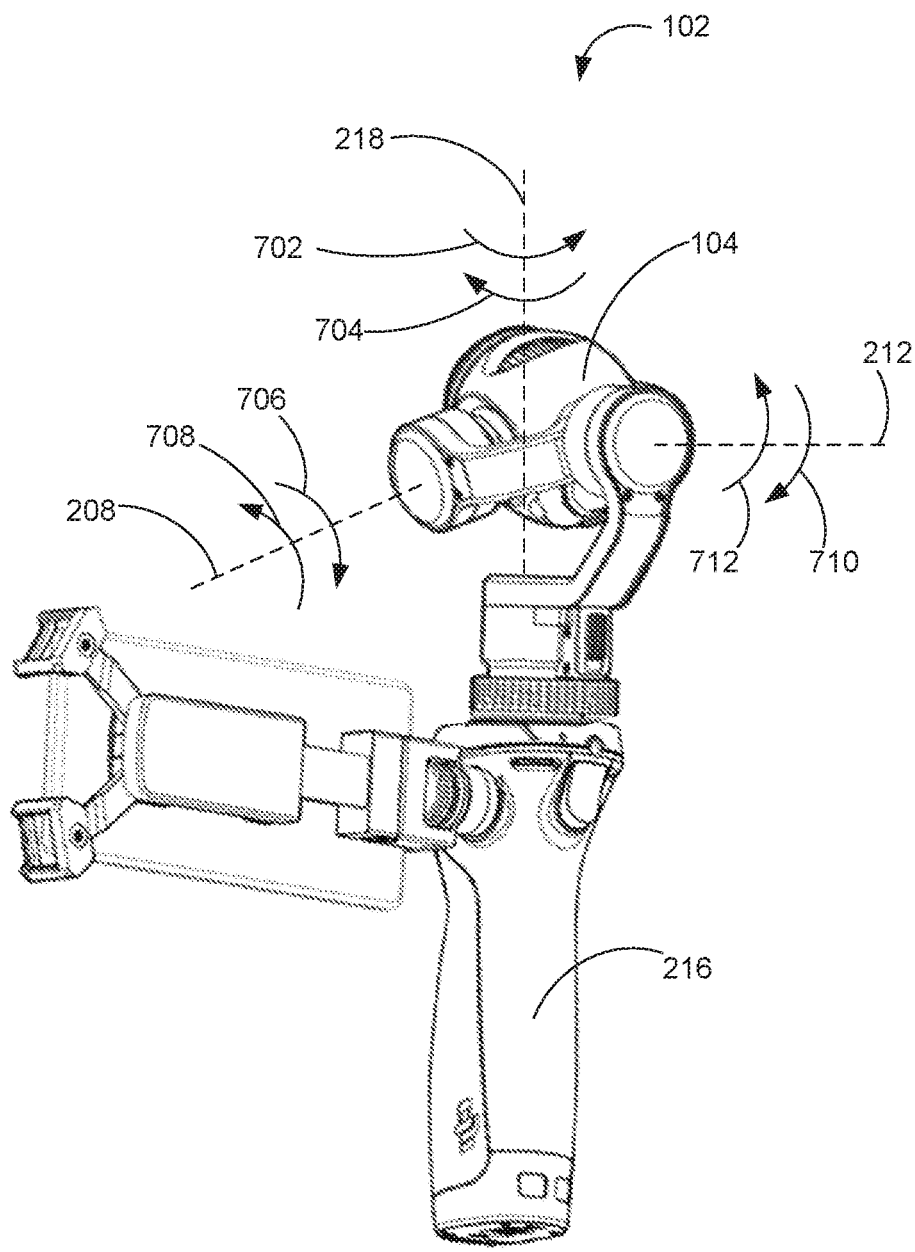
FIG. 7 illustrates gimbal responses to a user-provided query, in accordance with some embodiments.

FIG. 7 illustrates gimbal responses to a user-provided query, in accordance with some embodiments. For example, a gimbal response may include adjustment of a position of gimbal-mounted camera 104 relative to gimbal body 216. In some embodiments, adjustment of a position of gimbal-mounted camera 104 relative to gimbal body 216 includes adjusting the position of the gimbal-mounted camera 104 by providing an actuating signal to tilt motor 206 (for movement of camera 104 about a tilt axis 208), providing an actuating signal to roll motor 210 (for movement of camera 104 about a roll axis 212), and/or providing an actuating signal to pan motor 214 (for movement of camera 104 about a pan axis 218).

In some embodiments, to indicate a "yes" response, the gimbal-mounted camera 104 is adjusted in a "head nod" sequence, e.g., the gimbal-mounted camera 104 is adjusted in a first direction 706 about the tilt axis 208 and the gimbal-mounted camera 104 is subsequently adjusted in a second direction 708 about the tilt axis 208. In some embodiments, the "head nod" sequence is repeated one or more times. In some embodiments, to indicate a "no" response, the gimbal-mounted camera 104 is adjusted in a "head shake" sequence, e.g., the gimbal-mounted camera 104 is adjusted in a first direction 702 about the pan axis 208 and the gimbal-mounted camera is subsequently adjusted in a second direction 704 about the pan axis 208. In some embodiments, the "head shake" sequence is repeated one or more times. In some embodiments, to indicate an "I don't know" response, the gimbal-mounted camera 104 is adjusted in a "head bob" sequence, e.g., the gimbal-mounted camera 104 is adjusted in a first direction 710 about the roll axis 212 and the gimbal-mounted camera 104 is subsequently adjusted in a second direction 712 about roll axis 212. In some embodiments, the "head bob" sequence is repeated one or more times.

Figure 8A:
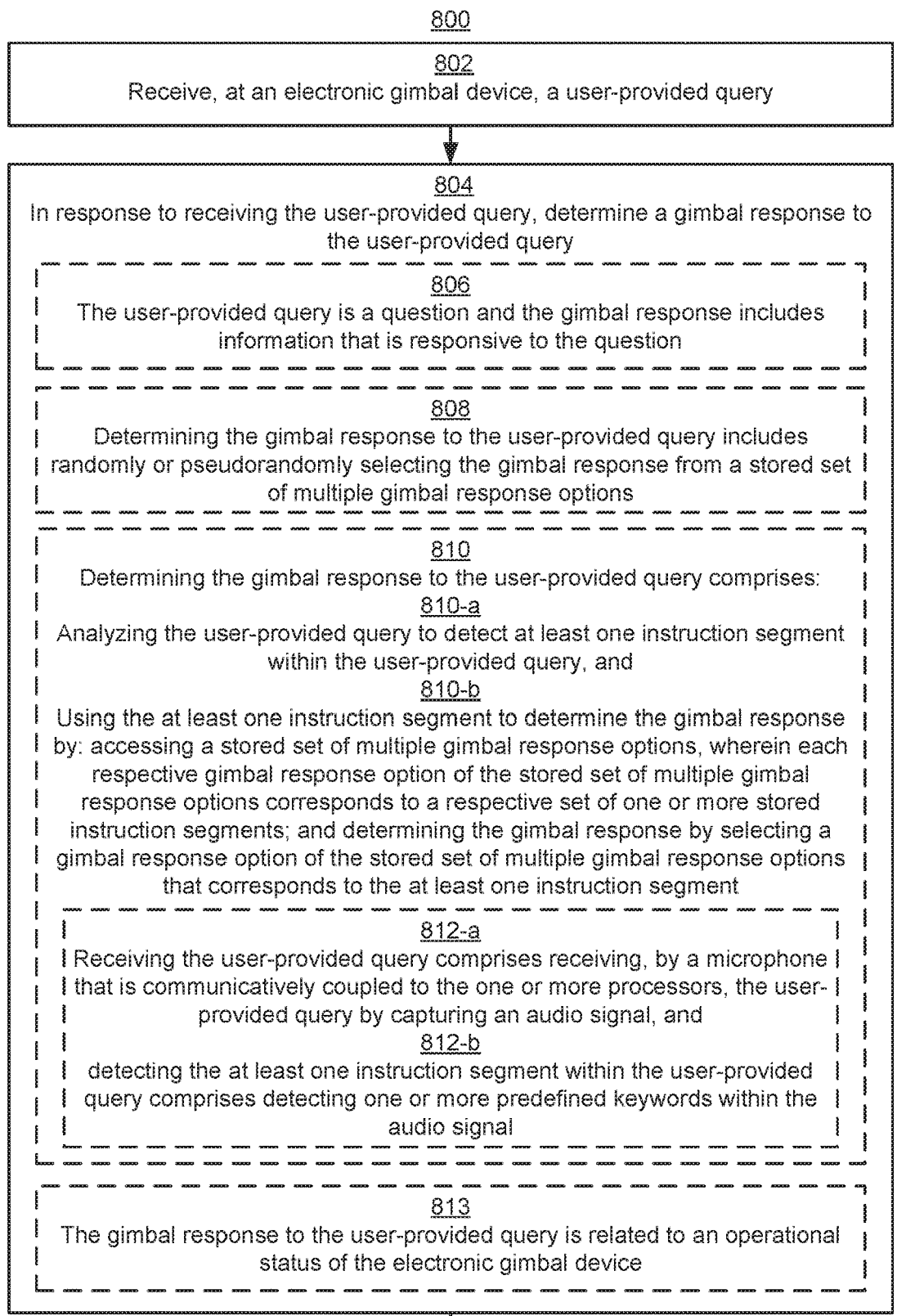

FIGS. 8A-8B are a flow diagram illustrating a method 800 for controlling an electronic gimbal device to indicate a gimbal response to a user-provided query, in accordance with some embodiments. The method 800 is performed at a device, such as the electronic device 106, the gimbal 102, and/or a remote computing device. In some embodiments, some or all of the instructions for performing the method 800 are stored in the gimbal memory 404 and executed by the gimbal processor(s) 402. In some embodiments, some or all of the instructions for performing the method 800 are stored in the electronic device memory 454 and executed by the electronic device processor(s) 452.

In some embodiments, some or all of method 800 is performed while an electronic device 106 is inserted into a support bracket 220 and/or while electronic device 106 is communicatively coupled to gimbal 102. In some embodiments, some or all of method 800 is performed while no electronic device 106 is inserted into the support bracket 220 and/or while no electronic device 106 is communicatively coupled to gimbal 102.

The device receives (802) a user-provided query. In some embodiments, the user-provided query is provided by a user to the gimbal 102 via a user input device such as the microphone 302, the microphone input 304, the joystick 222 and/or the gimbal-mounted camera 104 (e.g., by providing a gesture that can be detected by the gimbal-mounted camera 104). In some embodiments, the user-provided query is provided by a user to electronic device 106 via a user input device such as microphone 464, display 462 (e.g., via a control displayed on a touchscreen display), camera 466 (e.g., by providing a gesture that can be detected by the camera 466), and/or or other input device such as a keypad, button, knob, and/or dial.

Examples of user-provided queries include questions and/or instructions. In some embodiments, a user-provided query is a question that is related to an operational status of gimbal 102 and/or electronic device 106, such as "Does the battery need to be replaced?" and/or "Is there enough remaining storage space to record for five minutes?" as shown in FIG. 5. In some embodiments, a user-provided query is an instruction, such as an instruction selected from a list of options (e.g., "pan right," "pan left," "tilt clockwise," and/or "tilt clockwise").

In some embodiments, the user-provided query is received by an electronic device 106 that is communicatively coupled to the gimbal 102. In some embodiments, the electronic device 106 transmits information associated with the user-provided query to the gimbal 102. In some embodiments, the electronic device 106 determines the gimbal response to the user-provided query and transmits the determined gimbal response to the gimbal 102. In some embodiments, the gimbal 102 determines the gimbal response to the user-provided query. In some embodiments, the gimbal 102 transmits information associated with the determined gimbal response to the electronic device 106. In some embodiments, the electronic device 106 outputs (e.g., via a display 462, an audio output, or other I/O device 460) information that corresponds to the determined gimbal response.

In response to receiving the user-provided query, the device determines (804) a gimbal response to the user-provided query. In some embodiments, determining the gimbal response to the user-provided query includes querying a database (e.g., a database 460 stored by the electronic device 106 or a database of a remote device that is communicatively coupled to the electronic device 106). For example, the device determines a database result that corresponds to a keyword determined from a user-provided query.

In some embodiments, the user-provided query is a question (806) and the gimbal response includes information that is responsive to the question. In an illustrative example, in response to receiving the user-provided query, "does the gimbal battery need to be replaced," the device analyzes an operational state of the gimbal battery. In response to determining that the charge state of the battery is low (e.g., below 10%), the device determines a gimbal response of "yes." In response to determining that the charge state of the battery is not low (e.g., 10% or above), the device determines a gimbal response of "no." In some embodiments, the gimbal responses are limited to a binary set of answers. In some embodiments, the gimbal responses are limited to a defined set of answers. In some embodiments, the gimbal responses are not limited to a defined set of answers. For example, in some embodiments, a gimbal response includes a value and or range of values (e.g., a current battery level and/or battery level range is output via an output device of gimbal 102 and/or electronic device 106, such as a display or a speaker).

In some embodiments, determining the gimbal response to the user-provided query includes (808) randomly or pseudorandomly selecting the gimbal response from a stored set of multiple gimbal response options (e.g., stored in memory 454 of electronic device 106 and/or memory 404 of gimbal 102). In some embodiments, multiple sets of multiple response options are stored. In some embodiments, the device analyzes the received user-provided query to determine an instruction segment within the user-provided query, and the device selects a set of multiple response options from the multiple sets of multiple response options based on the determined instruction segment.

In an illustrative example, in response to receiving the user-provided query, "will I have a good day?", the device randomly or pseudorandomly selects a gimbal response from a stored set of options (e.g., ["yes," "no," "I don't know"]). For example, the selected response is displayed on display 462 of electronic device 106 and/or indicated by one or more adjustments to a position of camera 104, such as an adjustment described with regard to FIG. 7 (e.g., movement about a tilt axis 208 such that camera 104 appears to be "nodding"). In an illustrative example, in response to receiving the user-provided query, "what should I record today?", the device randomly or pseudorandomly selects a gimbal response from a stored set of options (e.g., ["skateboarding," "bicycle riding," "surfing," "running," "a friend"]). For example, the selected response is displayed on display 462 of electronic device 106.

In some embodiments, determining the gimbal response to the user-provided query (810) comprises analyzing (810-a) the user-provided query to detect at least one instruction segment within the user-provided query. For example, an instruction segment is a word or a set of words within the user-provided query, such as a predefined keyword or set of keywords. Determining the gimbal response to the user-provided query additionally comprises using (810-b) the at least one instruction segment to determine the gimbal response by: accessing a stored set of multiple gimbal response options (e.g., in memory 404, memory 454, and/or in a database 460), wherein each respective gimbal response option of the stored set of multiple gimbal response options corresponds to a respective set of one or more stored instruction segments, and determining the gimbal response by selecting a gimbal response option of the stored set of multiple gimbal response options that corresponds to the at least one instruction segment.

In some embodiments, receiving the user-provided query comprises receiving (812-a), by a microphone that is communicatively coupled to the one or more processors, the user-provided query by capturing an audio signal. In some embodiments, the microphone is a microphone that is coupled to processor(s) 402 of gimbal 102, such as microphone 302 and/or a microphone coupled to microphone input 304. In some embodiments, the microphone is microphone 464 coupled to processor(s) 452 of electronic device 106. In some embodiments, detecting the at least one instruction segment within the user-provided query comprises (812-b) detecting one or more predefined keywords (e.g. "battery," "memory," "pan," "tilt," "roll," "left," "right," "up," "down," "clockwise," "counterclockwise," "take photo," "start recording," "stop recording," "zoom in," and/or "zoom out") within the audio signal. In some embodiments, the predefined keywords include targeting information (e.g., "track me," "track this person," and/or "track this car.").

In some embodiments, before capturing the audio signal, the device displays a set of candidate user-provided queries on a display 462 of the electronic device 106 (e.g., candidate user-provided queries as shown on display 462 in FIG. 5). In some embodiments, each candidate user-provided query has an associated identifier. In some embodiments, after capturing the audio signal, the device determines whether the captured audio signal includes information that corresponds to an identifier associated with one of the candidate user-provided queries. In some embodiments, the device uses a determined identifier that corresponds to a candidate user-provided query to determine a gimbal response In some embodiments, the gimbal response to the user-provided query is related (813) to an operational status of the electronic gimbal device. In some embodiments, determining a gimbal response to the user-provided query includes determining that the user-provided query is related to an operational status (e.g., using speech recognition and/or pattern recognition techniques). In some embodiments, an operational status is, for example, a charge state of a battery of gimbal 102, a charge state of a battery of electronic device 106, a remaining storage area of memory 454, a remaining storage area of memory 404, a camera orientation state of the gimbal-mounted camera 104, a camera movement state of the gimbal-mounted camera 104, and/or a camera imaging parameter of the gimbal-mounted camera 104 such as a zoom level, imaging quality, and/or image capture rate. In some embodiments, the device analyzes an operational parameter (e.g., battery charge level, available memory value, and/or camera imaging parameter) to determine a gimbal response related to the operational status. In some embodiments, in response to determining that the user-provided query is related to an operational status (e.g., a battery charge level), the device determines a current operational status (e.g., a current battery charge level).

In some embodiments, the gimbal response includes a predetermined movement and/or sequence of movements. In some embodiments, in response to determining that a current operational status meets first operational status criteria (e.g., battery level is >80%), the device determines that a first gimbal response includes a first sequence of movements (e.g., movement pattern A). In response to determining that a current operational status meets second operational status criteria (e.g., battery level is <40%), the device determines that a gimbal response includes a second sequence of movements (e.g., movement pattern B).

The device controls (814) the electronic gimbal device 102 to indicate the determined gimbal response. For example, the device adjusts a position of the gimbal-mounted camera 104 to indicate the determined gimbal response. In some embodiments, controlling the electronic gimbal device 102 to indicate the determined gimbal response includes adjusting a position of the gimbal-mounted camera 104, for example, by providing an actuating signal to a first actuator (e.g., tilt motor 206) for movement of the gimbal-mounted camera 104 about a tilt axis 208, providing an actuating signal to a second actuator (e.g., roll motor 210) for movement of the gimbal-mounted camera 104 about a roll axis 212, and/or providing an actuating signal to a third actuator (e.g., pan motor 214) for movement of the gimbal-mounted camera 104 about a pan axis 218. In some embodiments, adjusting a position of the gimbal-mounted camera 104 includes adjusting one or more optical properties of the gimbal-mounted camera 104.

In some embodiments, gimbal-mounted camera 104 is not limited to a camera, but can be any other object and/or device. In some embodiments, controlling the electronic gimbal device 102 as described with regard to 814 includes adjusting a non-camera device or other object and/or device.

In some embodiments, controlling the electronic gimbal device 102 comprises (816) rotating a gimbal-mounted camera 104 of the electronic gimbal device 102 about at least one of a pan axis 218, a tilt axis 208, and/or a roll axis 212. In some embodiments, to indicate a "yes" response, the gimbal-mounted camera is adjusted in a "head nod" sequence, for example, as described with regard to FIG. 7. In some embodiments, to indicate a "no" response, the gimbal-mounted camera is adjusted in a "head shake" sequence, for example, as described with regard to FIG. 7. In some embodiments, to indicate an "I don't know"

response, the gimbal-mounted camera is adjusted in a "head bob" sequence, for example, as described with regard to FIG. 7.

In some embodiments, the device captures (818-*a*), by a gimbal-mounted camera 104 or by a camera of a user mobile device (e.g., the camera 466 of the electronic device 106), two or more images (e.g., a first image 602 as described with regard to FIG. 6A and a second image 604 as described with regard to FIG. 6B). In some embodiments, the two or more images are transmitted from the user mobile device (e.g., the electronic device 106) via communication system 456 to gimbal 102. In some embodiments, the camera (e.g., camera 104 and/or camera 466) captures the two or more images (e.g., a first image 602 as described with regard to FIG. 6A and a second image 604 as described with regard to FIG. 6B). In some embodiments, the device detects (818-*b*) a movement pattern of a target within the two or more images (e.g., a movement pattern as described with regard to the subject 606 of FIGS. 6A-6B). In some embodiments, the device determines (818-*c*) the gimbal response using information that includes the detected movement pattern.

In some embodiments, a camera of the user mobile device (e.g., camera 466 of electronic device 106) captures one or more images that include a user gesture. For example, a user gesture is a rectangle shape formed with two of the user's hands. Many alternative gestures having various associated gimbal responses may be recognized by the gimbal 102. In some embodiments, the gimbal 102 receives the one or more images that include the user gesture from the user mobile device (e.g. electronic device 106 transmits the one or more images to gimbal 102). In some embodiments, a camera 104 of gimbal 102 captures one or more images that include a user gesture. In some embodiments, a gimbal response to a user gesture includes one or more adjustments of a position of the gimbal-mounted camera 104 and/or one or more adjustments to one or more camera parameters of the gimbal-mounted camera 104. For example, in response to receiving an image that includes a user gesture, the device adjusts the gimbal-mounted camera 104 such that the gimbal-mounted camera 104 is directed at the user gesture (e.g., one or more images captured by the gimbal-mounted camera 104 are centered and/or substantially centered on the rectangle shape formed by the user's hands), the gimbal-mounted camera 104 changes a zoom level to correspond to a region indicated by the user gesture (e.g., an area that corresponds to the rectangle shape formed by the user's hands), and/or the gimbal-mounted camera captures an image.

In some embodiments, controlling the electronic gimbal device 102 includes (820) directing the gimbal mounted camera 104 toward the target. For example, a position of the gimbal-mounted camera (e.g., camera 104 of gimbal 102) is adjusted such that the gimbal-mounted camera is directed at a subject 606 as described with regard to FIGS. 6A-6B.

In some embodiments, the gimbal provides the determined gimbal response while tracking a target (e.g., subject 606) by adjusting a position of the gimbal-mounted camera 104 to keep the target within the field of view of the camera. In some embodiments, the range of motion for the gimbal-mounted camera is limited based on the tracking (e.g., a movement of the gimbal-mounted camera is stopped when a target is within a predefined distance of an edge of an image frame, such as when subject 606 is within boundary 610 as described with regard to FIG. 6B).

In some embodiments, the device is enabled to adjust a position of the gimbal-mounted camera and to adjust a camera operating parameter in response to receive one or more instructions. For example, in some embodiments, the device receives a first user instruction, such as an instruction to alter a position of the gimbal-mounted camera 104 relative to the gimbal 102 and/or to adjust operation of the gimbal-mounted camera 104.

In some embodiments, the device determines a set of one or more gimbal operating parameters based on the first user instruction. For example, gimbal operating parameters include parameters for controlling tilt motor 206, roll motor 210, and/or pan motor 214 to rotate camera 104 about tilt axis 208, roll axis 212, and/or pan axis 218, as described with regard to FIG. 2 and/or as described with regard to FIG. 7. In some embodiments, the gimbal operating parameters include one or more camera operating parameters, e.g., parameters for capturing a single image, starting video capture and/or stopping video capture by camera 104. In some embodiments, camera operating parameters include, e.g., parameters for adjusting and/or setting a zoom level, shutter speed, aperture, ISO, frame rate, frame resolution and/or parameters to set a target for the camera to follow.

In some embodiments, determining the set of one or more gimbal operating parameters and camera operating parameters based on the first instruction includes querying a database (e.g., a database 460 stored by the electronic device 106 or a database of a remote device that is communicatively coupled to the electronic device 106) to determine a set of one or more predefined parameters (e.g., for the gimbal 102 and/or the camera 104) that correspond to the first user instruction.

In some embodiments, the device operates the gimbal 102 in accordance with the set of one or more gimbal operating parameters and camera operating parameters. In some embodiments, the electronic device 106 operates the gimbal 102 by sending a control instruction to the gimbal 102 to cause the gimbal 102 to control a gimbal motor (the tilt motor 206, the roll motor 210, and/or the pan motor 214) and/or the gimbal-mounted camera 104.

In some embodiments, the device receives a second user instruction. For example, the second user instruction is an instruction that specifies a target (e.g., a subject 606 as described with regard to FIGS. 6A-6B). The device operates the gimbal 102 to direct the gimbal-mounted camera 104 at a target (e.g., a person, such as a target user (for example, the subject 606), or another remote object) in response to the second user instruction. The device tracks movement of the target by processing image frames of the target captured by the gimbal-mounted camera 104. The device operates the gimbal 102 to re-direct the gimbal-mounted camera 104 at the target when the movement of the target exceeds a predefined boundary (e.g., boundary 610 as described with regard to FIG. 6B).

In some embodiments, the device receives a third user instruction. For example, while a target is being tracked, the device receives a third user instruction such as an instruction to tilt the gimbal-mounted camera 104 upward (e.g., to capture a subject that is above the tracked target). In some embodiments, when the gimbal-mounted camera 104 tilts upward, the gimbal-mounted camera 104 loses sight of the tracking target, after which the device causes tracking of the target to be resumed. The device operates the gimbal 102 to cause the gimbal-mounted camera 104 to perform a predefined movement pattern in response to the third user instruction. The device resumes the tracking movement of the target within image frames of the target captured by the camera 104 (e.g., when the predefined movement pattern is complete). The device re-aligns the camera 104 with the target when the movement of the target exceeds a predefined boundary (e.g., a boundary 610 as described with regard to FIG. 6B).

In some embodiments, receiving the first user instruction comprises capturing an audio signal corresponding to the first user instruction by a microphone (e.g., microphone 464) of the electronic device. The device detects one or more predefined keywords within the audio signal. The device determines the set of one or more gimbal operating parameters and camera operating parameters based on the first user instruction in accordance with the one or more predefined keywords.

In some embodiments, the predefined keywords include targeting information (e.g., "track me," "track this person," and/or "track this car."). The device determines a current configuration of the gimbal 102. The device determines a target configuration of the gimbal 102 based on the targeting information. The device determines the set of one or more gimbal operating parameters and camera operating parameters based on the first user instruction in accordance with the one or more predefined keywords using a difference between the target configuration of the gimbal and the current configuration of the gimbal. In some embodiments, the device additionally determines a current configuration of camera 104 and target configuration of the camera 104 and determines the set of one or more gimbal operating parameters and camera operating parameters based on the first user instruction in accordance with the one or more predefined keywords using a difference between the current configuration of the gimbal-mounted camera 104 and the target configuration of the camera 104.

In some embodiments, the device determines a set of one or more parameters associated with the candidate user instructions. The device determines the set of one or more gimbal operating parameters and one or more camera operating parameters based on the first user instruction in accordance with the one or more predefined keywords using the one or more parameters associated with the candidate user instructions.

Many features of the present disclosure can be performed in, using, or with the assistance of hardware, software, firmware, or combinations thereof. Consequently, features of the present disclosure may be implemented using a processing system. Exemplary processing systems (e.g., processor(s) 402 and/or 452) include, without limitation, one or more general purpose microprocessors (for example, single or multi-core processors), application-specific integrated circuits, application-specific instruction-set processors, field-programmable gate arrays, graphics processing units, physics processing units, digital signal processing units, coprocessors, network processing units, audio processing units, encryption processing units, and the like.

Features of the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 404, 454 and/or database 460) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems, and execution environments/containers.

Communication systems as referred to herein (e.g., the communication system 408 and/or 456) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method, comprising:
   at an electronic gimbal device having one or more processors and memory storing instructions for execution by the one or more processors:
      receiving a user-provided query;
      in response to receiving the user-provided query, determining a gimbal response to the user-provided query; and
      controlling the electronic gimbal device to indicate the determined gimbal response;
   wherein determining the gimbal response to the user-provided query includes:
      analyzing the user-provided query to detect at least one instruction segment within the user-provided query; and
      using the at least one instruction segment to determine the gimbal response by:
         accessing a stored set of multiple gimbal response options, wherein each respective gimbal response option of the stored set of multiple gimbal response options corresponds to a respective set of one or more stored instruction segments, and
         determining the gimbal response by selecting a gimbal response option of the stored set of multiple gimbal response options that corresponds to the at least one instruction segment.

2. The method of claim 1, wherein the user-provided query is a question and the gimbal response includes information that is responsive to the question.

3. The method of claim 1, wherein determining the gimbal response to the user-provided query includes randomly or pseudorandomly selecting the gimbal response from a stored set of multiple gimbal response options.

4. The method of claim 1, wherein:
   receiving the user-provided query comprises receiving, by a microphone that is communicatively coupled to the one or more processors, the user-provided query by capturing an audio signal; and
   detecting the at least one instruction segment within the user-provided query comprises detecting one or more predefined keywords within the audio signal.

5. The method of claim 1, wherein controlling the electronic gimbal device comprises rotating a gimbal-mounted camera of the electronic gimbal device about at least one of a pan axis, a tilt axis, or a roll axis.

6. The method of claim 1, further comprising:
   capturing, by a gimbal-mounted camera or by a camera of a user device, two or more images;
   detecting a movement pattern of a target within the two or more images; and
   determining the gimbal response using information that includes the detected movement pattern.

7. The method of claim 6, wherein controlling the electronic gimbal device includes directing the gimbal-mounted camera toward the target.

8. The method of claim 1, wherein the gimbal response to the user-provided query is related to an operational status of the electronic gimbal device.

9. A system comprising:
   an electronic gimbal device that includes one or more processors configured to:
      acquire, via a gimbal-mounted camera or a camera of a user mobile device, two or more images;
      detect a movement pattern of a target within the two or more images;
      receive a user-provided query;
      in response to receiving the user-provided query, determine a gimbal response using information that includes the detected movement pattern; and
      control the electronic gimbal device to indicate the determined gimbal response, wherein determining the gimbal response comprises:
         analyzing the user-provided query to detect at least one instruction segment within the user-provided query; and
         using the at least one instruction segment to determine the gimbal response by:
            accessing a stored set of multiple gimbal response options, wherein each respective gimbal response option of the stored set of multiple gimbal response options corresponds to a respective set of one or more stored instruction segments, and
            determining the gimbal response by selecting a gimbal response option of the stored set of multiple gimbal response options that corresponds to the at least one instruction segment.

10. The system of claim 9, wherein the user-provided query is a question and the gimbal response includes information that is responsive to the question.

11. The system of claim 9, wherein determining the gimbal response to the user-provided query includes randomly or pseudorandomly selecting the gimbal response from a stored set of multiple gimbal response options.

12. The system of claim 9, further comprising:
a microphone that is communicatively coupled to the one or more processors;
wherein:
receiving the user-provided query comprises receiving, by the microphone, the user-provided query by capturing an audio signal; and
detecting the at least one instruction segment within the user-provided query comprises detecting one or more predefined keywords within the audio signal.

13. The system of claim 9, wherein:
the electronic gimbal device comprises one or more actuators that are communicatively coupled to the one or more processors and configured to adjust a position of the electronic gimbal device, and
controlling the electronic gimbal device to indicate the determined gimbal response comprises rotating, by the one or more actuators, a gimbal-mounted camera of the electronic gimbal device about at least one of a pan axis, a tilt axis, or a roll axis.

14. The system of claim 9, further comprising:
the user mobile device, wherein the user mobile device is detachably coupled to the electronic gimbal device.

15. The system of claim 9, wherein controlling the electronic gimbal to indicate the determined gimbal response includes directing the gimbal-mounted camera toward the target.

16. The system of claim 9, wherein the gimbal response to the user-provided query is related to an operational status of the electronic gimbal device.

17. A non-transitory computer readable storage medium storing one or more programs, the one or more programs comprising instructions, which when executed, cause an electronic gimbal device to:
receive a user-provided query;
in response to receiving the user-provided query, determine a gimbal response using information from the user-provided query; and
control the electronic gimbal device to indicate the determined gimbal response;
wherein determining the gimbal response to the user-provided query includes:
analyzing the user-provided query to detect at least one instruction segment within the user-provided query; and
using the at least one instruction segment to determine the gimbal response by:
accessing a stored set of multiple gimbal response options, wherein each respective gimbal response option of the stored set of multiple gimbal response options corresponds to a respective set of one or more stored instruction segments, and
determining the gimbal response by selecting a gimbal response option of the stored set of multiple gimbal response options that corresponds to the at least one instruction segment.

* * * * *